Sept. 30, 1969     W. J. CARTWRIGHT     3,469,670
CAN TRANSFER MECHANISM
Filed Jan. 30, 1967     12 Sheets-Sheet 4

ARM OSCILATING CAM

INVENTOR
WILLIAM J. CARTWRIGHT
BY
Mason, Porter, Diller & Brown
ATTORNEYS

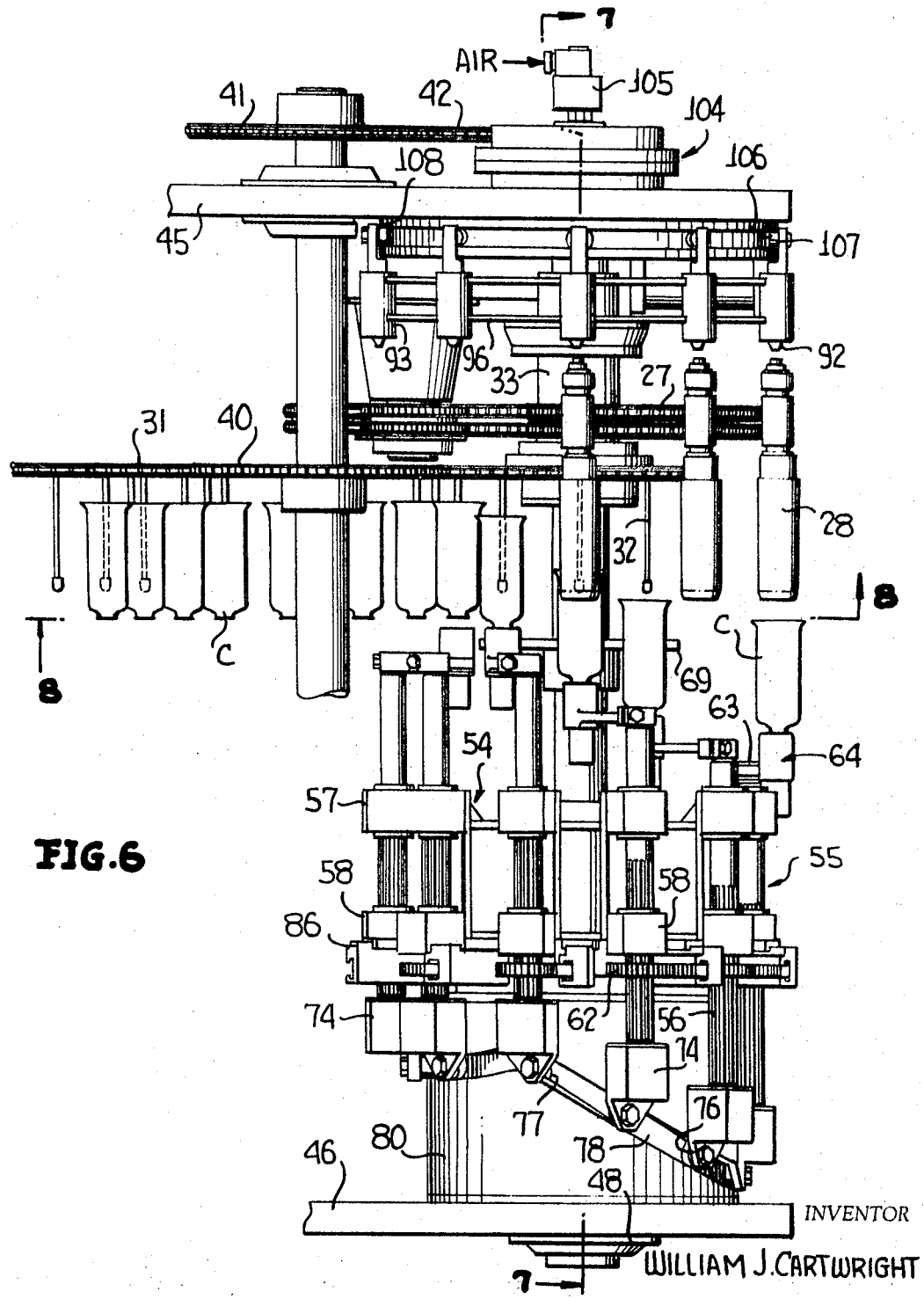

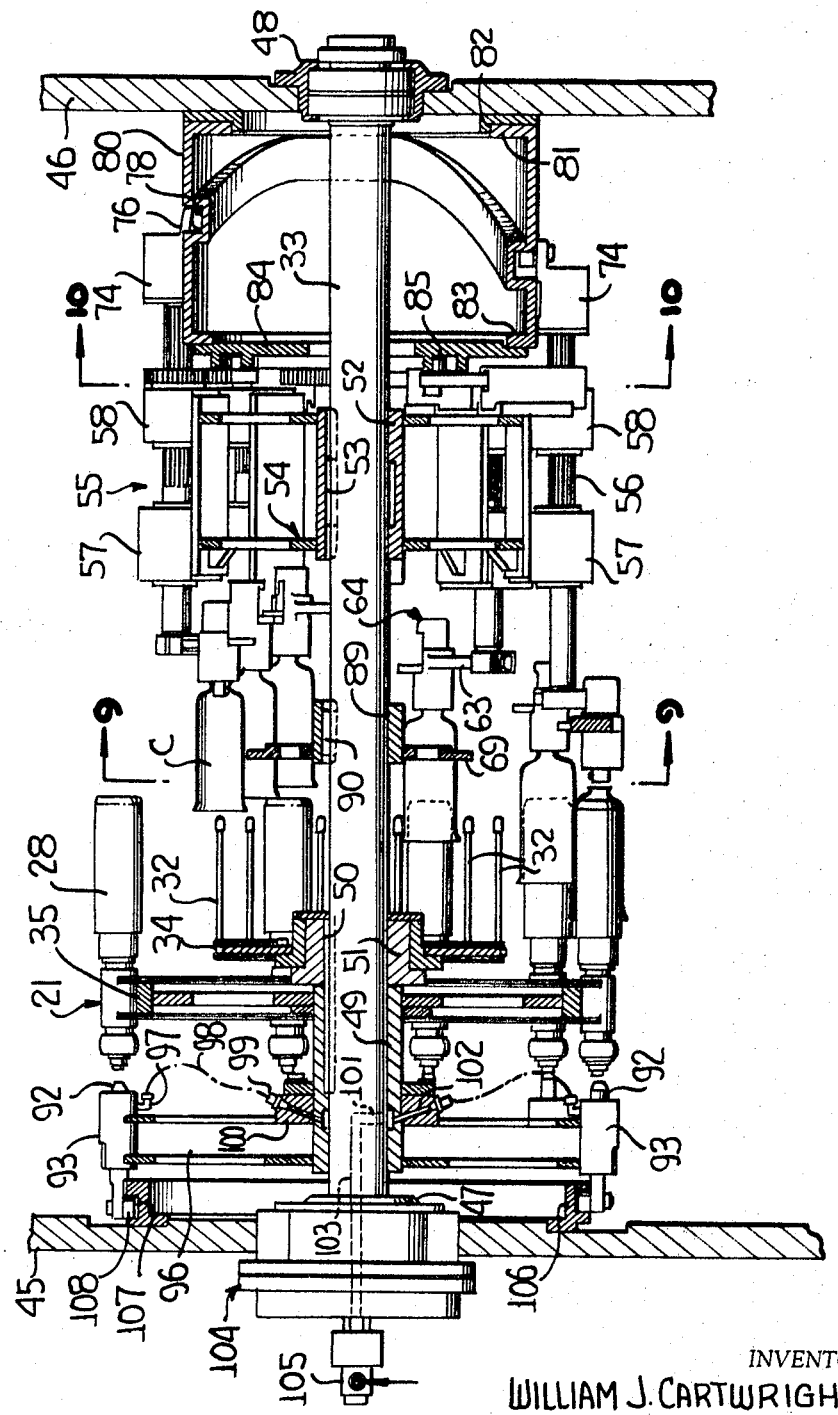

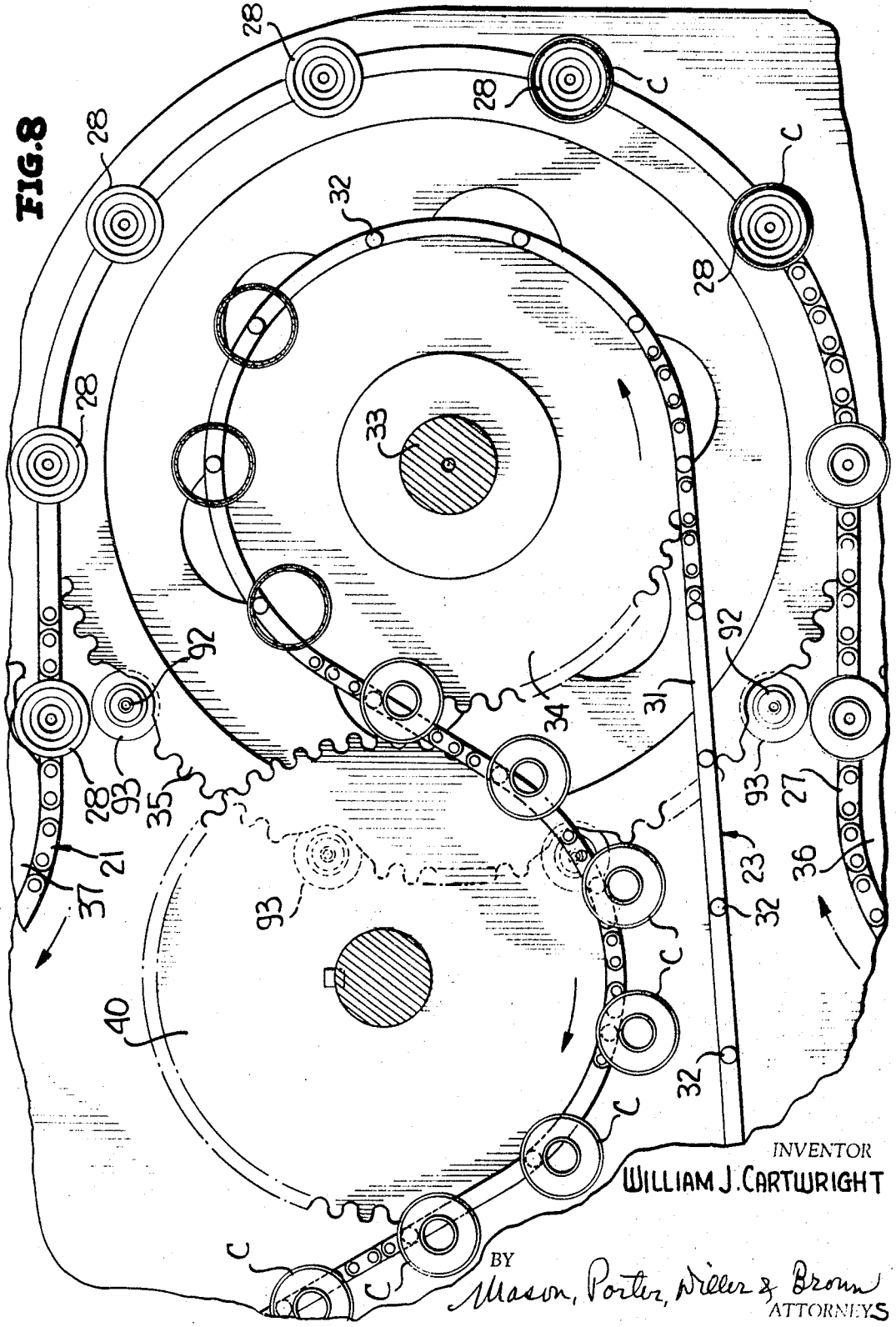

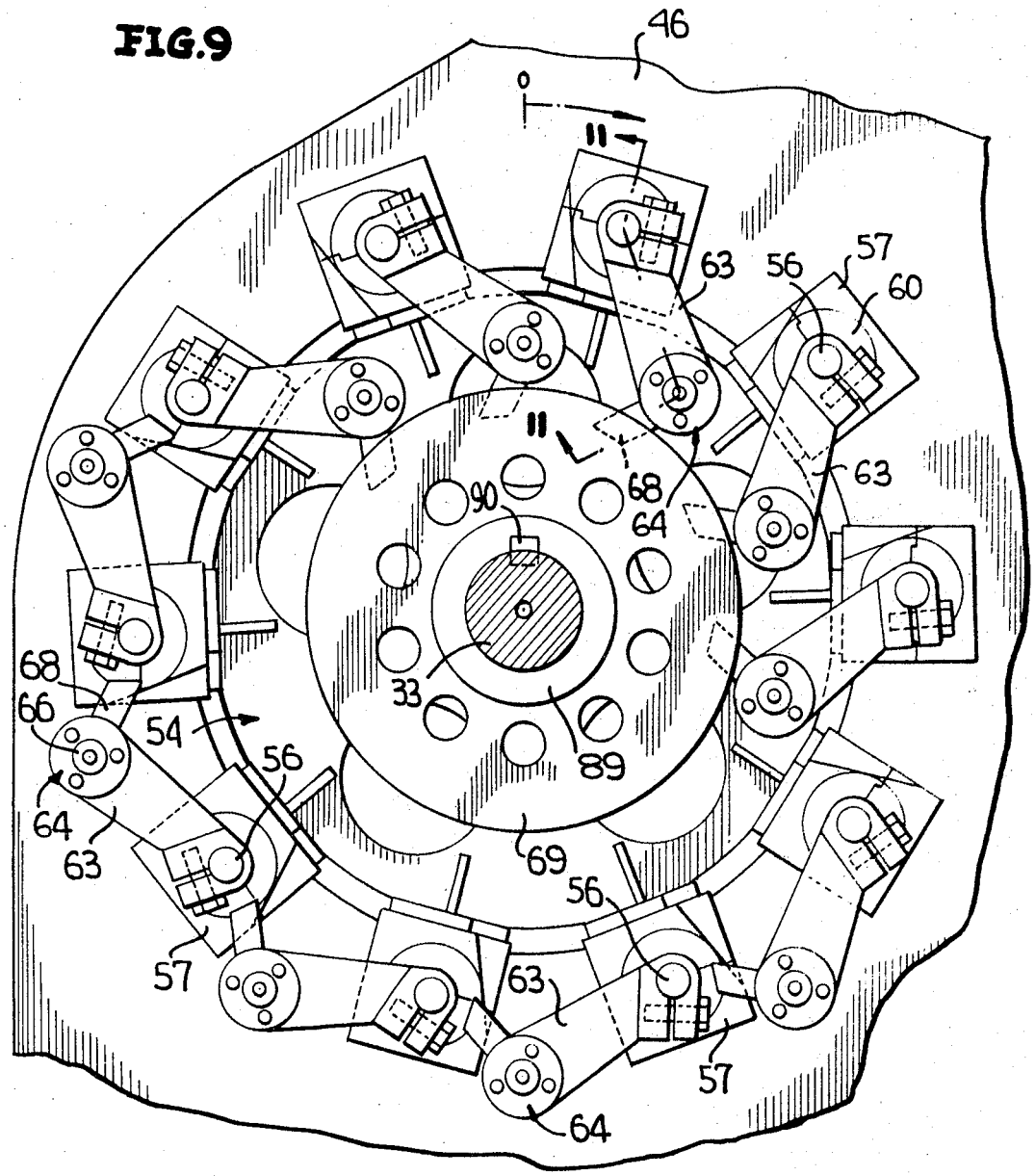

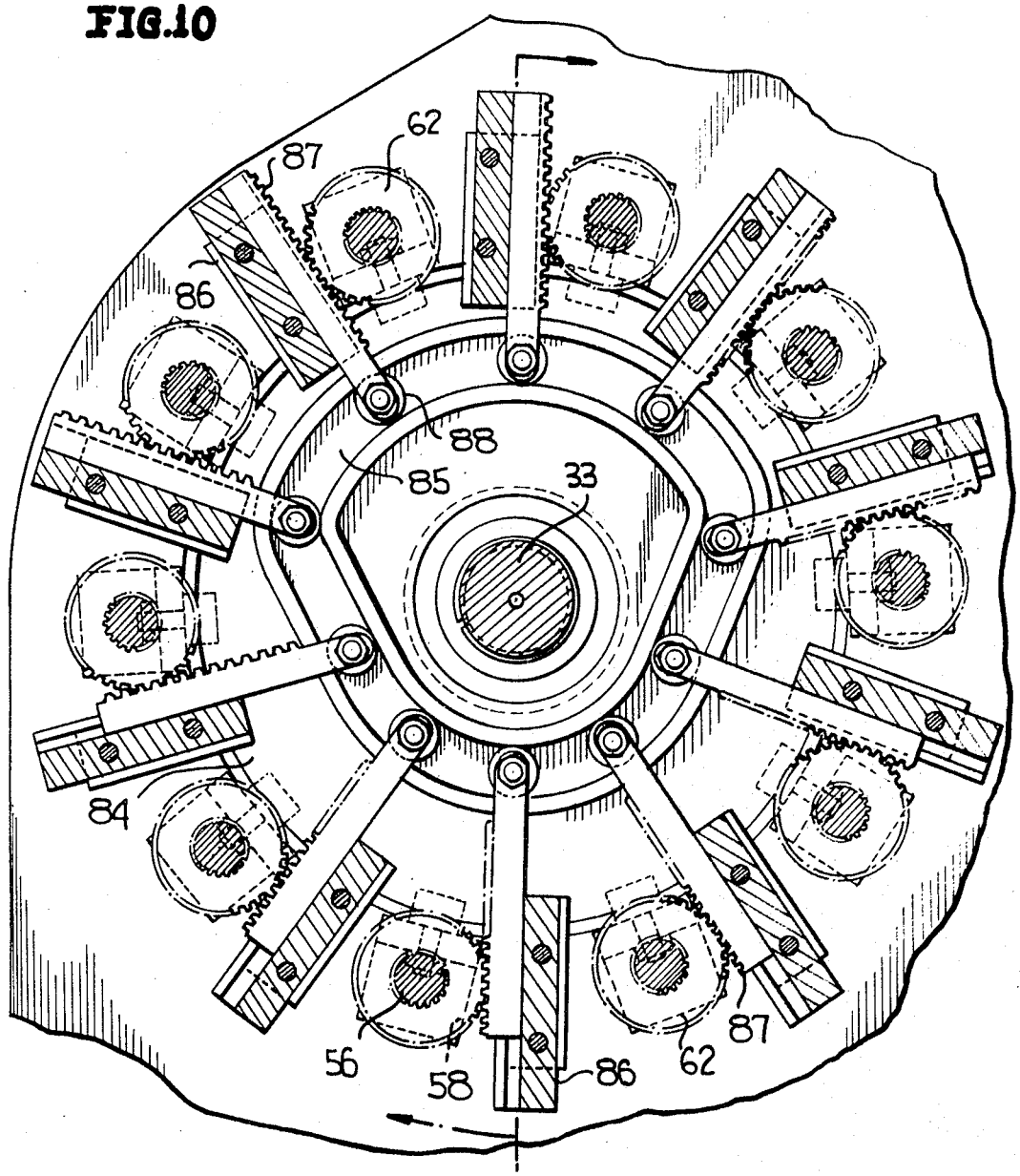

Sept. 30, 1969 W. J. CARTWRIGHT 3,469,670
CAN TRANSFER MECHANISM
Filed Jan. 30, 1967 12 Sheets-Sheet 10
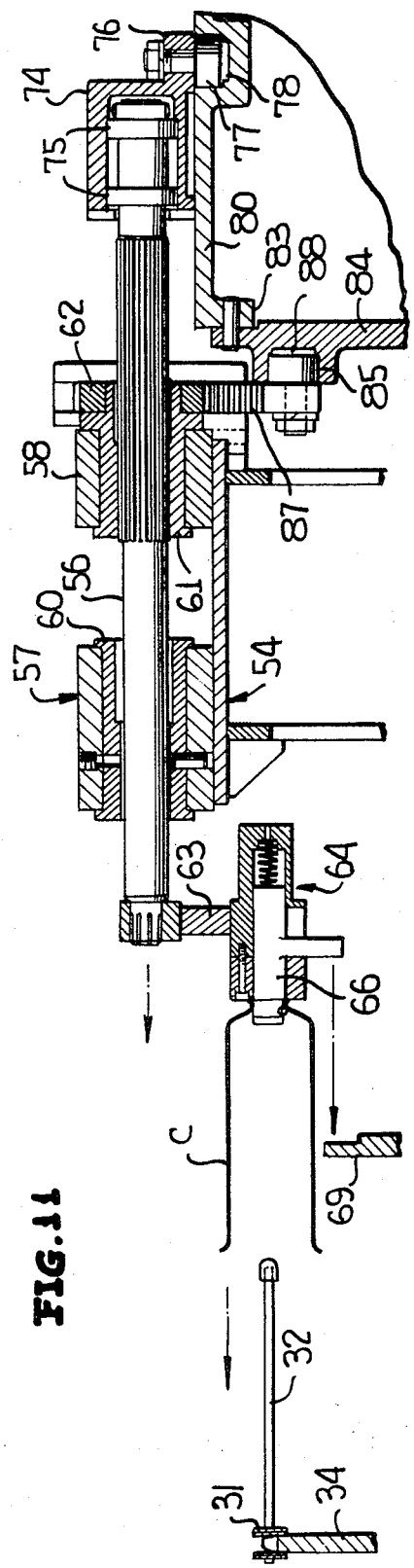
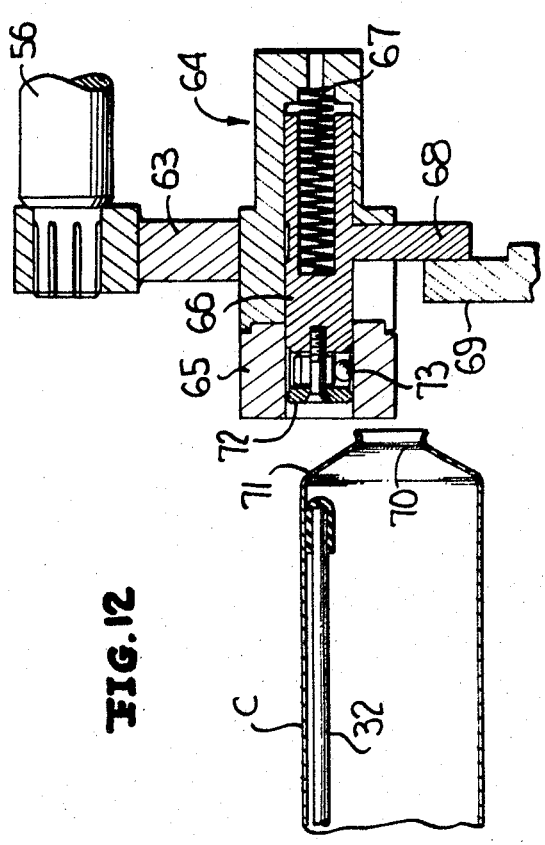
INVENTOR
WILLIAM J. CARTWRIGHT
BY Mason, Porter, Diller & Brown
ATTORNEYS

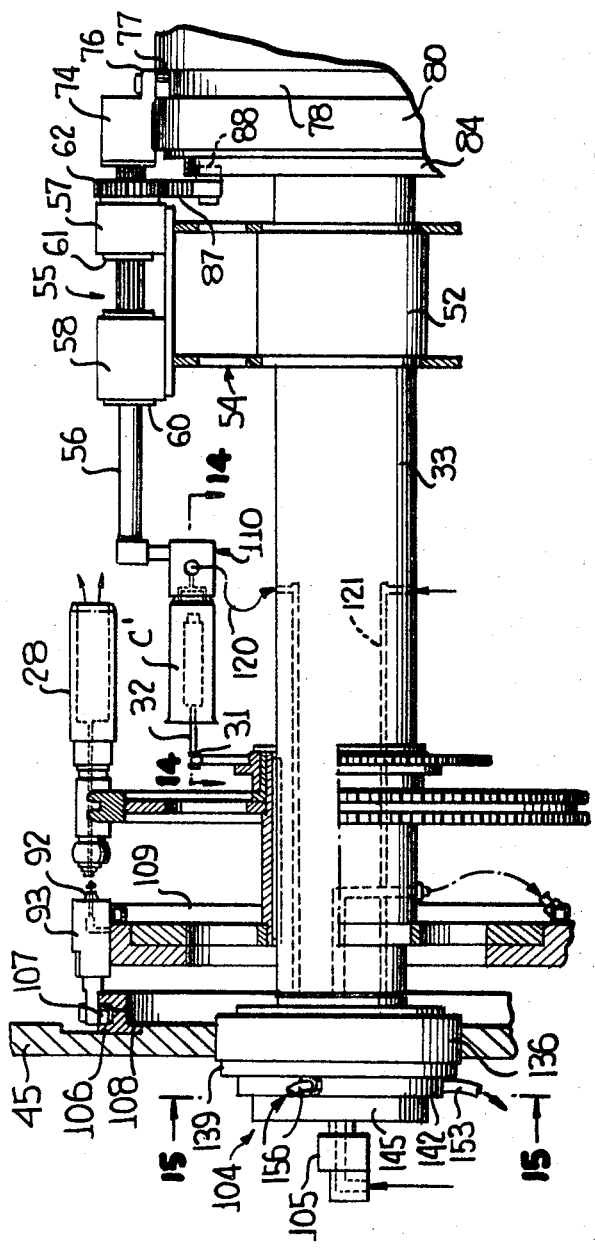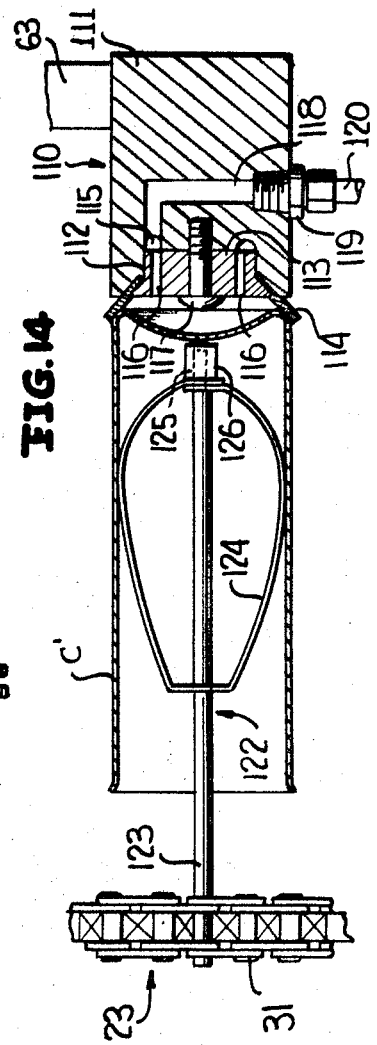

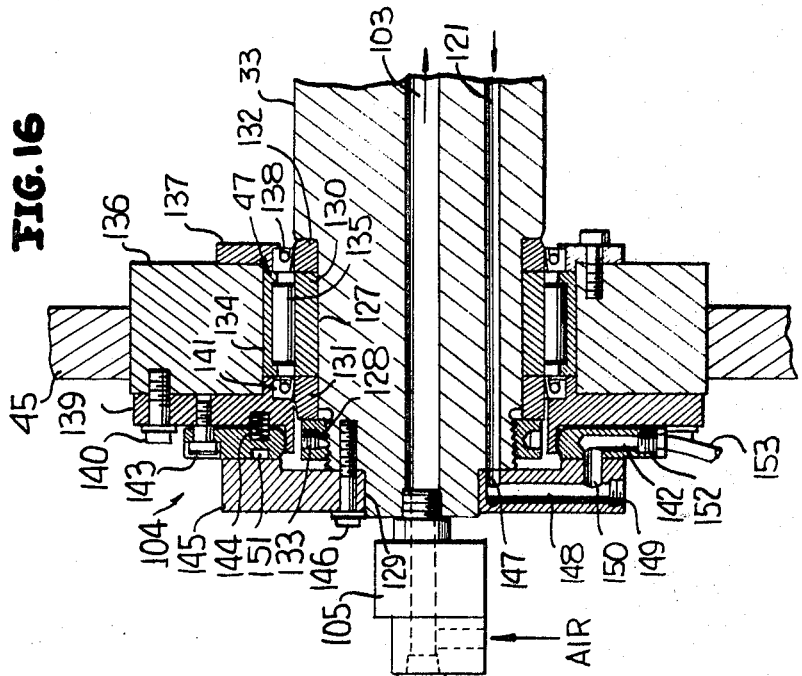

United States Patent Office 3,469,670
Patented Sept. 30, 1969

3,469,670
CAN TRANSFER MECHANISM
William J. Cartwright, Palos Park, Ill., assignor to
Continental Can Company, Inc., New York, N.Y.,
a corporation of New York
Filed Jan. 30, 1967, Ser. No. 612,670
Int. Cl. B65g 47/00
U.S. Cl. 198—22    23 Claims

ABSTRACT OF THE DISCLOSURE

This disclosure has to do with a transfer mechanism which includes first and second endless conveyors moving in like direction along adjacent paths around a fixed axis and wherein each conveyor has article supports uniformly spaced therealong with the spacing of the supports of the two conveyors being different. A transfer unit is also mounted for rotation about the fixed axis and includes a plurality of arms which are swingable from positions aligned with the supports of one of the conveyors to positions aligned with the supports of the other of the conveyors to effect the transfer of articles from one of the conveyors to the other of the conveyors.

---

This invention relates in general to new and useful improvements in can handling mechanisms, and more particularly to a novel mechanism for transferring cans from one conveyor to another wherein the spacings of the cans carried by the two conveyors are different.

In accordance with this invention, it is proposed to provide a transfer arrangement wherein two endless conveyors pass around sprockets mounted for rotation on a common axis and wherein the radii of the sprockets are different. As supports carried by the conveyors pass around the axis of the sprockets, articles carried by supports of a first of the conveyors are removed therefrom and, while continuing to move circumferentially, are moved radially into alignment with the supports on the second conveyor.

In accordance with this invention, it is a primary object to provide a novel transfer apparatus which will automatically transfer widely spaced articles carried by a first conveyor onto more narrowly spaced supports carried by a second conveyor whereby the spacing between articles may be greatly reduced.

Another object of this invention is to produce a novel transfer apparatus which is suitable for transferring tubular members, including can bodies, from one conveyor to another, which transferring apparatus is positive in operation and is mounted with respect to the conveyors so as to always be timed relative thereto so that the transfer of articles is assured.

Another object of this invention is to provide a novel transfer unit which includes a frame assembly which is mounted for rotation about an axis and has a plurality of circumferentially spaced shafts mounted therein parallel to the axis of rotation, each of the shafts having extending generally radially therefrom an arm on which there is mounted a transfer element, and each shaft being mounted with respect to the supporting frame for both axial and oscillatory movement, and there being provided means for effecting the reciprocation and oscillation of the shafts in timed relation to the rotation of the transfer unit whereby as the transfer unit rotates, the transfer elements thereof are oscillated between two circular paths of rotation.

A further object of this invention is to provide a novel transfer assembly which includes a pair of endless conveyors and a transfer unit which are particularly adapted for handling tubular articles, such as can bodies, and which transfer assembly is provided with means for assuring the positive transfer of the articles from a first of the conveyors to the transfer unit and then from the transfer unit to a second of the conveyors.

A still further object of this invention is to provide a novel transfer assembly for transferring can bodies from a first endless conveyor to a second endless conveyor, the two endless conveyors passing about sprockets mounted for rotation on a common aixs and having can body supports lying in a common plane and facing in the same direction, and there being provided a transfer unit which is also mounted for rotation about the axis of the sprockets and having transfer elements normally spaced from and opposing the plane of the article supports of the conveyors, the transfer unit having a mechanism for oscillating the transfer elements between a path of movement coincidental with the path of movement of the supports of one of the conveyors to a path of movement coincidental with the path of movement of the supports of the other conveyor, and there being positive means for forcing a tubular article carried by supports of the first conveyor onto the transfer elements when the transfer elements are in alignment with the supports, and then, after the transfer elements have come into alignment with the supports of the second conveyor, positively moving the tubular articles onto the second conveyor supports, all of said transferring taking place while the tubular articles are moving about an arcuate path and there being positive support of the tubular articles at all times during the transferring thereof.

With the above and other objects in view that will hereinafter appear, the nature of the invention will be more clearly understood by reference to the following detailed description, the appended claims and the several views illustrated in the accompanying drawings:

In the drawings:

FIGURE 6 is a plan view of the transfer assembly.

FIGURE 7 is a fragmentary vertical sectional view taken along the line 7—7 of FIGURE 6 through the axis of the transfer assembly.

FIGURE 8 is an enlarged fragmentary transverse vertical sectional view taken along the line 8—8 of FIGURE 6.

FIGURE 9 is an enlarged fragmentary vertical transverse sectional view taken along the line 9—9 of FIGURE 7 with the cans omitted and shows specifically the details of the transfer units.

FIGURE 10 is an enlarged fragmentary transverse vertical sectional view taken along the line 10—10 of FIGURE 7 and shows specifically the drive for oscillating the shafts which support the transfer elements.

FIGURE 11 is a fragmentary sectional view taken axially of the transfer assembly along the line 11—11 of FIGURE 9 and shows specifically the mounting of one of the transfer elements.

FIGURE 12 is an enlarged fragmentary sectional view along the same plane as FIGURE 11 and shows specifically the manner in which a can is removed from the transfer element.

FIGURE 13 is a fragmentary plan view of the transfer assembly showing only one supporting element of each of the conveyors and only one of the transfer elements and illustrates the specific manner in which the transfers are performed.

FIGURE 14 is a fragmentary vertical sectional view on an enlarged scale taken along the line 14—14 of FIGURE 13 and shows the specific details of a modified form of transfer element and can support.

FIGURE 15 is a fragmentary enlarged vertical sectional view taken along the line 15—15 of FIGURE 13 and shows the specific details of a valve element of the transfer assembly.

FIGURE 16 is a fragmentary vertical sectional view on an enlarged scale taken along the line 16—16 of FIGURE 15 and shows further the details of the valve assembly and the air passages associated therewith.

Figure 1:
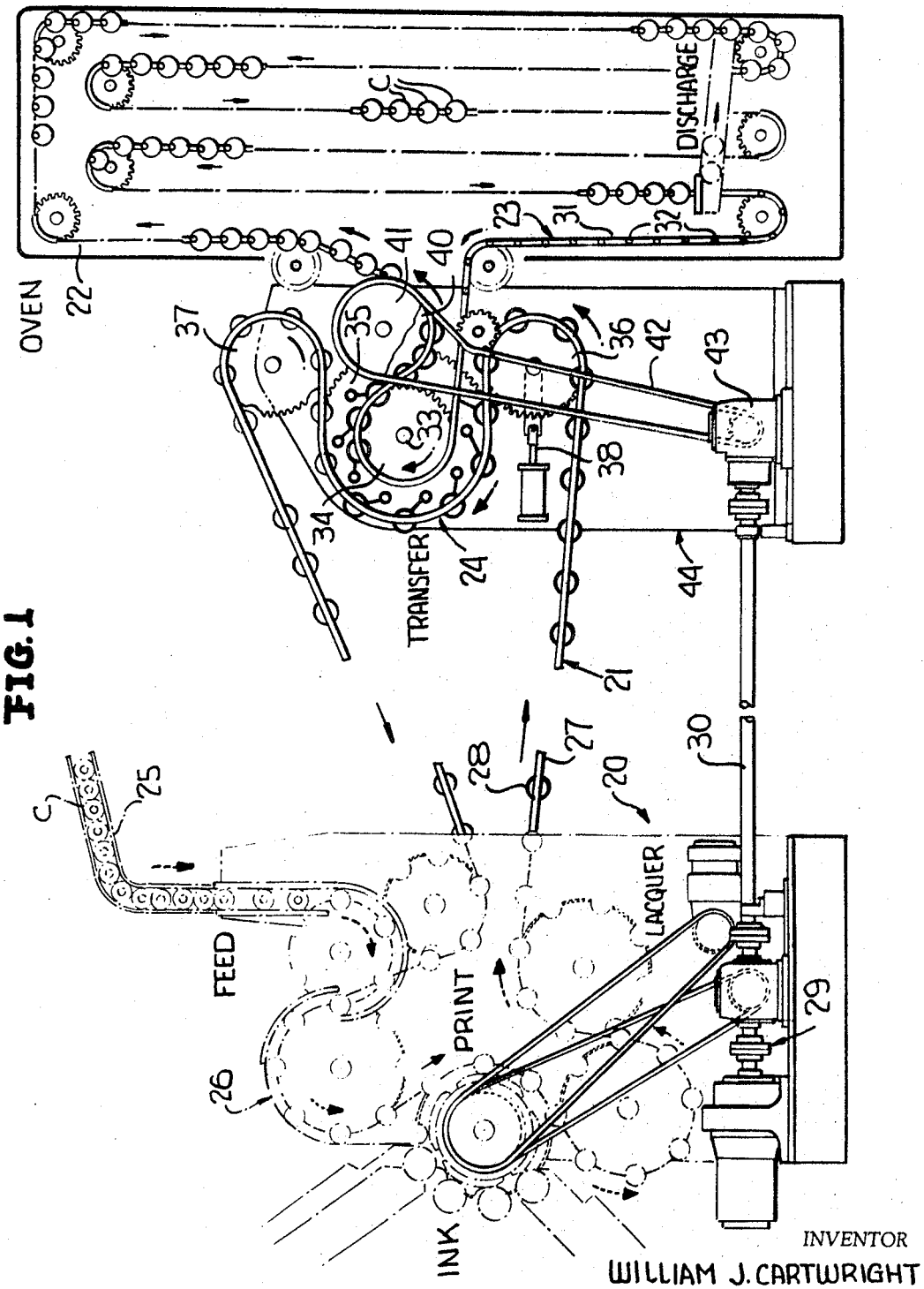
FIGURE 1 is a schematic side elevational view of the transfer apparatus and shows the general relationship thereof with respect to a printing mechanism and an oven for curing the printing applied to the surfaces of can bodies.
Figure 2:
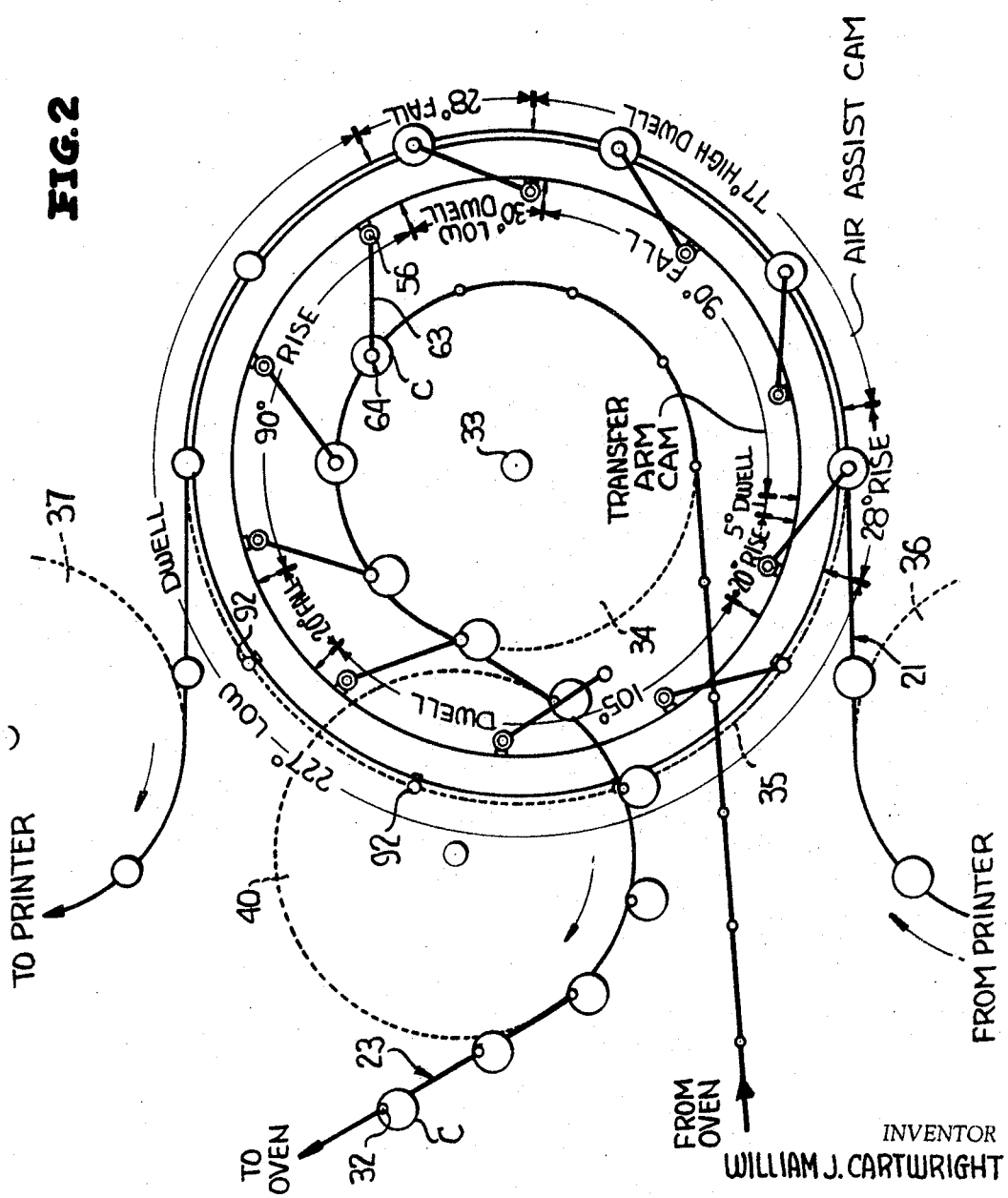
FIGURE 2 is a diagrammatic view showing the specific sequence of can transfer and cam arrangement.

Referring now to the drawings in detail with particular reference to FIGURE 1, it will be seen that there is illustrated an over-all apparatus for printing the external surfaces of cans and curing such printing. The apparatus includes a printing mechanism 20 through which cans are fed by means of a conveyor 21. In accordance with this invention, the printed cans are passed through an oven 22 by means of a conveyor 23. The transfer of the cans from the conveyor 21 to the conveyor 23 is performed by means of a transfer assembly, which is generally referred to by the numeral 24, the transfer assembly 24 being the principal feature of this invention.

It is to be noted that cans C are fed to the printing mechanism 20 in closely spaced relation along a chute 25 and are delivered to the conveyor 21 by means of a transfer assembly 26. The conveyor 21 includes an endless chain 27 which carries, at relatively widely spaced intervals, supports 28 which are in the form of mandrels.

The conveyor 21 is guided through the printing mechanism 20 by means of suitable sprockets and extends outwardly therefrom. The printing mechanism 20 and the conveyor 21 are driven by means of a suitable drive unit 29 which has extending therefrom a drive shaft 30. The drive shaft 30 is utilized in driving the conveyor chain 23 in a manner to be described in more detail hereinafter.

The conveyor 23 includes a chain 31 of a construction to be readily passed over sprockets. The chain 31 carries can supports 32 in the form of holders. Spacing of the can supports 32 is much less than that of the can supports 28 and cans C carried by the supports 32 are disposed in closely adjacent relation. This permits a larger number of cans to be placed in the oven 22 at one time and thereby provides for the curing of the printing on the cans within an oven of a minimum size.

The transfer assembly 24 includes a main shaft 33 which will be described in more detail hereinafter. The main shaft 33 carries a sprocket 34 over which the conveyor chain 31 is entrained and a sprocket 35 over which the conveyor chain 27 is entrained. The sprockets 34 and 35 are disposed in side-by-side adjacent relation on the shaft 33.

It is to be noted that the conveyor 21 passes around a pair of idler sprockets 36 and 37 immediately adjacent the sprocket 35 whereby the conveyor 21 passes around the sprocket 35 in a clockwise direction, as viewed in FIGURE 1, from the bottom to the top thereof. In order that the conveyor chain 27 may be properly tensioned, the sprocket 36 is adjustably mounted and a suitable tension control device 38 is coupled to the mounting therefor for adjusting the position thereof to maintain the desired tension in the conveyor chain 27.

The conveyor 23 also passes around its respective sprocket 34 in a clockwise direction from the bottom to the top thereof. The conveyor 23 passes from the sprocket 34 under a sprocket 40 before it enters the oven 22. This sprocket is utilized in driving the conveyor 23 while the conveyor chain 27 is utilized in driving the main shaft 33 of the transfer assembly.

The driving of the sprocket 40 is accomplished by means of a sprocket 41 which is mounted on a common shaft with the sprocket 40 and which sprocket 41 is driven by means of a drive chain 42 from a right angle drive unit 43 which is, in turn, driven by the drive shaft 30. The conveyor 23 being entrained around the sprocket 40 is driven thereby in synchronism with the conveyor 21.

It will be readily apparent from the showing of FIGURE 1 that the transfer assembly 24, in transferring the cans C from the mandrels 28 of the conveyor 21 to the holders 32 of the conveyor 23, compensates for the difference in spacings of the conveyors 21 and 23 and automatically aligns transferred cans with the holders 32 despite the wider spacing of the mandrels 28.

As is clearly shown in FIGURE 1, the transfer assembly 24 is supported by a suitable frame which is generally referred to by the numeral 44. Referring now to FIGURE 7, it will be seen that the frame 44 includes a pair of upstanding side plates 45 and 46. The side plate 45 has mounted therein a bearing 47 which is aligned with a bearing 48 carried by the side plate 46. The main shaft 33 is suitably journalled within the bearings 47 and 48.

Adjacent the left end thereof, as viewed in FIGURE 7, the main shaft 33 is provided with a sleeve 49 which is keyed to the shaft 33 by means of an elongated key 50. The sleeve 49 has mounted thereon at the inner end thereof the sprocket 35. A second sleeve 51 is mounted on the shaft 33 immediately adjacent the sleeve 49 and is secured to the shaft 33 by the key 50. The sleeve 51 has freely rotatably mounted thereon the hub portion of the sprocket 34. It it to be understood that the shaft 33 is driven through the sprocket 35 by the conveyor 21, and the sprocket 34 is mounted for free rotation with respect to the shaft 33.

The main shaft 33 has mounted thereon to the right of the center thereof, as viewed in FIGURE 7, a further sleeve 52. The sleeve 52 is keyed onto the main shaft 33 by means of a key 53. The sleeve 52 is part of a supporting frame, generally referred to by the numeral 54, which carries a transfer unit, generally referred to by the numeral 55.

It is to be noted from FIGURES 1 and 8 that as the mandrels 28 and the can holders 32 pass around the shaft 33, they are in radial alignment. Thus, if the conveyors 21 and 23 extended completely about their respective sprockets 35 and 34, there would be a predetermined number of mandrels and can holders encircling the shaft 33. The transfer unit 55 has a number of shafts 56 equal to this would-be number of mandrels and can holders. The shafts 56 are supported by the supporting frame 54 generally radially outwardly thereof. Each shaft 56 is supported by a pair of bearing blocks 57, 58 for both axial reciprocatory movement and oscillatory movement.

Referring now to FIGURE 11, it will be seen that the bearing block 57 has secured therein a sleeve bearing 60 in which the associated shaft 56 is mounted for oscillating reciprocatory movement.

The bearing block 58 has a sleeve 61 mounted therein for rotation only. The sleeve 61 has a splined sliding coupling with the shaft 56 which permits the reciprocation thereof relative to the sleeve 61 while the shaft 56 and the sleeve 61 oscillate together within the bearing block 58. The sleeve 61 has a pinion 62 secured to one end thereof which is driven in a manner to be described in more detail hereinafter to impart the necessary oscillatory movement to the shaft 56.

The inner end of each of the shafts 56 has mounted thereon a radially offset arm 63. Each arm 63 carries a transfer element, which is generally referred to by the numeral 64.

Referring now to FIGURE 12 in particular, it will be seen that each transfer element 64 includes a housing 65 of a split construction in which there is mounted for axial reciprocatory movement a pin or plunger 66. The pin 66 is urged to the left, as viewed in FIGURE 12, by means of a compression spring 67 and is movable to the right to a retracted position by means of a radially projecting finger 68 which is, in turn, engageable behind a cam member 69 during a predetermined portion of the cycle of rotation of the transfer unit 55. The pin or plunger 66 is particularly adapted to be received within a neck or collar portion 70 of a can having a cone type end 71. The plunger 66 has a rounded nose 72 readily receivable within the neck 70 and immediately to the right of the nose 72 is a spring loaded ball detent 73 which is engageable within the can C behind the neck 70 to retain the can C on the plunger 66. This relationship of the can C and the plunger 66 is best shown in FIGURE 11.

In order to effect the timed reciprocation of each shaft 56, each shaft has mounted on the right end thereof, as view in FIGURES 7 and 11, a housing 74 in which the right end of the respective shaft 56 is rotatably journalled by means of suitable bearings 75. The right end of the housing 74 is provided with an ear 76 to which there is secured a cam follower 77. The cam follower 77 is seated in a cam track which extends circumferentially about the axis of the main shaft 33.

Reference is now once again made to FIGURE 7 wherein it is shown that the cam track 78 is integrally formed in a large sleeve member 80 which is provided at the right end thereof, as viewed in FIGURE 7, with a radially inwardly directed mounting flange 81. The mounting flange 81 is suitably seated in a mounting ring 82 carried by the side plate 46 and is fixed against rotation.

At the left end of the sleeve member 80, as viewed in FIGURES 7 and 11, there is a second radially inwardly directed mounting flange 83. The mounting flange 83 has fixedly secured thereto a plate 84 which is annular in outline and which has integrally formed on the left surface thereof a cam track 85.

Referring now to FIGURES 10 and 11 in particular, it will be seen that adjacent each of the bearing blocks 58 there is mounted on the supporting frame 54 a guide unit 86 for a radially reciprocating rack 87. Each rack 87 is in meshed engagement with an associated one of the pinions 62 whereby when a rack 87 is radially reciprocated, it will oscillate the the associated pinion 62. The radially inner end of each rack 87 is provided with a cam follower 88 which is seated in the cam track 85 wherein as the racks 87 are rotated about the axis of the main shaft 33, the racks 87 will be reciprocated in predetermined timed relation. It is to be understood that the oscillation of each sleeve 61 by the reciprocation of its associate rack 87 will result in the oscillation of the sleeve on which the pinion 62 is mounted and that due to the splined connection between each sleeve 61 and its associated shaft 56, the associated shaft 56 will be oscillated. This will effect a rocking or oscillatory movement of the transfer element 64 carried by the shaft 56.

Reference is once again made to FIGURE 7 wherein it is shown that the cam member 69 is carried by a sleeve 89. The sleeve 89, in turn, is fixedly secured to the central portion of the main shaft for rotation therewith by means of a key 90.

Figure 5:
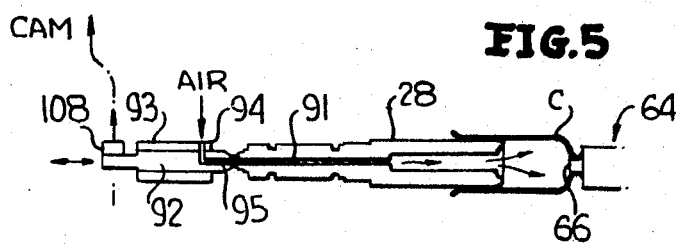
FIGURE 5 is a sectional diagrammatic view showing the manner in which air is delivered into a cam supporting mandrel to effect the discharge of a can therefrom onto an aligned transfer element.

Reference is now made to FIGURE 5 wherein it is shown that each mandrel 28 is provided with a passage 91 extending axially therethrough. The passage 91 serves two purposes. When a can C is being placed on the mandrel 28 in the printing mechanism 20, the can may be vented through the passage 91. In the transfer assembly 24, the passage 91 may be advantageously utilized for directing air into the can C to move the can C off of the mandrel 28 and onto the transfer element 64. In order to effect the directing of air or other fluid through the passage 91, there is associated with each mandrel 28 as it passes through the transfer assembly 24, a nozzle 92. Each nozzle 92 is mounted for axial reciprocatory movement within a sleeve type holder 93 having a fixed passage 94 with which a passage 95 of the nozzle 92 is aligned when the nozzle 92 is in sealed engagement with the associated mandrel 28 and in communication with the passage 91 therethrough.

Referring now to FIGURE 7, it will be seen that the holders 93 are mounted in circumferentially spaced relation on a frame 96 which is carried by the sleeve 49. Each holder 93 is provided with a fitting 97 to which there is connected a conduit 98 which has the opposite end thereof connected to a fitting 99 which is carried by a manifold type ring 100. The ring 100 is mounted on the sleeve 49 for rotation therewith.

It is to be noted that the sleeve 49 is part of the manifold in that the surface thereof contacting the main shaft 33 is grooved to define an annular passage 101. Radiating passages 102 extend between the fittings 99 and the passage 101 with the passages 102 passing through the ring 100 and the sleeve 49.

The main shaft 33 has a passage 103 extending axially therethrough from the left end thereof, as viewed in FIGURE 7, and then opens radially into the passage 101. At the left end of the main shaft 33 there is a rotary valve assembly 104, and a rotary union type supply fitting 105 is secured directly to the end of the main shaft 33.

It is to be noted that on the right face of the side plate 45 there is mounted a cam member 106 having an external cam track 107 formed therein. Cam followers 108, which are carried by the nozzles 92, ride in the cam track 107 and function to axially reciprocate the nozzles 92 in timed relation to the operation of the transfer assembly 24.

Figure 4:
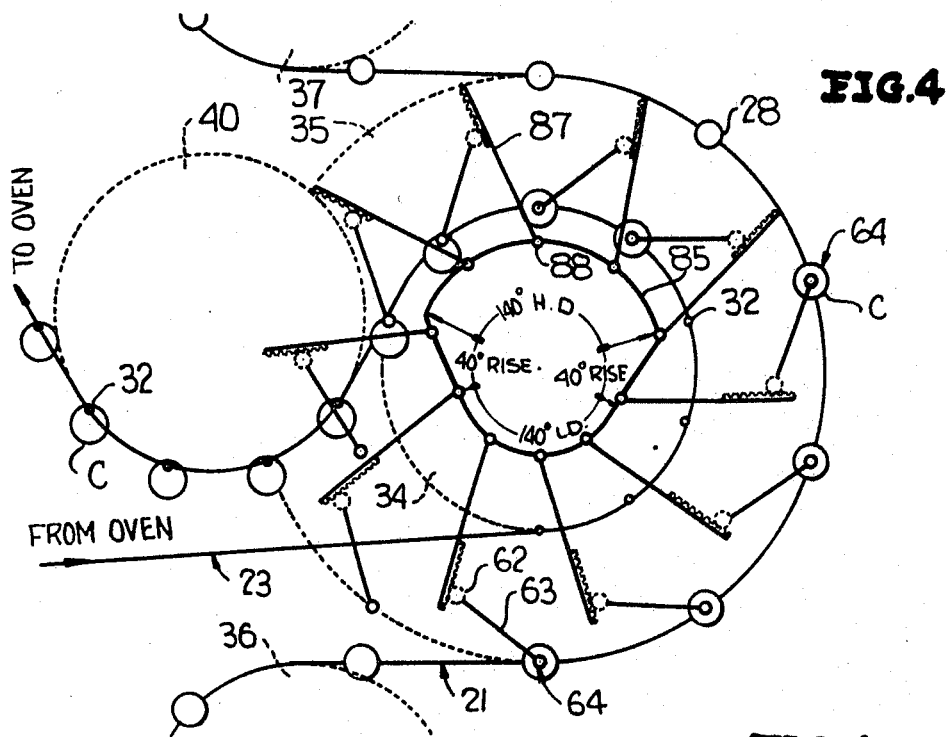
FIGURE 4 is a diagrammatic view showing the manner in which the transfer elements are pivoted to effect the movement thereof between the two different radii paths of the two conveyors and the details of the cam for accomplishing such movement.

Referring once again to FIGURE 7, it will be seen that the mandrels 28 lie substantially in a common plane with the can holders 32. As was previously described, each mandrel 28 is in radial alignment with a can holder 32. The mandrels and the can holders face in a like direction. The transfer elements 64 are mounted in opposed relation to the mandrels 28 and the can holders 32. Further, it is to be understood that the length of the arms 63 and the amount of oscillatory movement of the shaft 56 is such that the transfer elements 64 are movable between a position aligned with the mandrels 28 and a position aligned with the can holders 32. As is clearly shown in FIGURE 4, each transfer element 64 is associated with one mandrel 28 and one can holder 32. After it receives a can C from a mandrel 28, it swings inwardly into alignment with the associated can holder 32 to position the can thereon.

Operation

Figure 3:
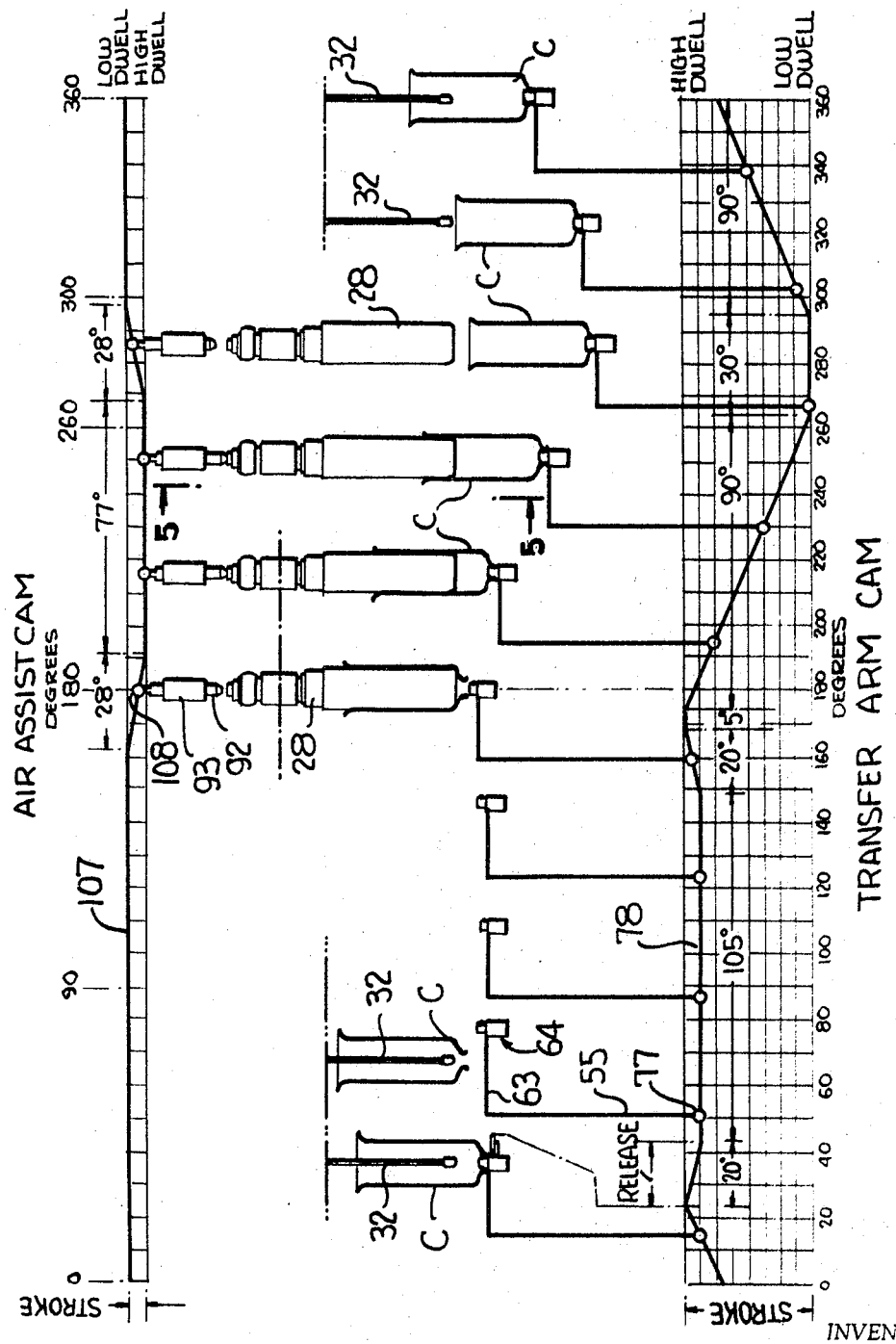
FIGURE 3 is a developed diagrammatic view of the transfer mechanism for showing the transfer of cans from first supports to transfer elements and from transfer elements to second supports.
Figure 4A:
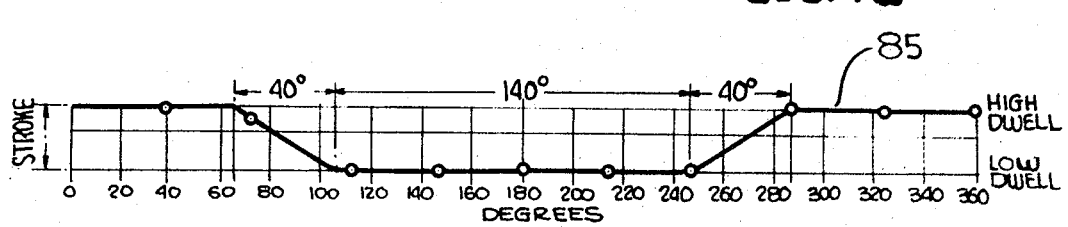
FIGURE 4a is a developed schematic of the cam for oscillating the transfer elements.

In FIGURES 3 and 4a there is illustrated the specific details of the cam 78, which effects the reciprocatory movement of the shafts 56 and the transfer arms carried thereby, the cam 85, which effects the oscillatory movement of the shafts 56 and the arms carried thereby, and the cam 107, which effects the reciprocatory movement of the nozzles 92. It will be apparent from these two figures that all operations of the transfer assembly 24 are automatically performed in timed relation.

The conveyor 21 delivers the cans C to the transfer assembly 24. Normally each mandrel 28 will carry a can C. The cans C enter into the transfer assembly 24 at the bottom part thereof. As soon as the cans begin to pass around the axis of main shaft 33, the cam 78, which has previously positioned a respective one of the transfer elements 64 closely adjacent the path of the ends of the mandrels 28, is effective to move the respective transfer element 64 into engagement with the can. At the time that the plunger 66 becomes fully engaged within a can and the ball detent 73 thereof is locked behind the neck portion thereof, retraction of the shaft 55 and the transfer element 64 carried thereby begins. At the same time, a nozzle 92 aligned with the associated mandrel 28 is brought into engagement with the opposite end of the mandrel 28 and air or other fluid is directed through the mandrel 28 to aid in the removal of the can C from the mandrel.

After a can has been completely removed from its associated mandrel, the retraction of the shaft 56 and the transfer element 64 carried thereby discontinues, and the cam 85 becomes effective to move the rack 87 coupled to the associated shaft 55 through the pinion 62 with which it is meshed, the transfer element 64 is swung inwardly from its position of alignment with the path of movement of the mandrels to a position aligned with the path of movement of the can holders 32 so as to place the can carried thereby in alignment with the associated can holder 32.

As the can approaches a position of full telescoping over the can holder 32, the finger 68 of the transfer element 64 comes into engagement with the cam member 69. Further movement of the transfer element 64 towards the can holder 32 results in the plunger 66 being retracted within the housing 65 to the extent that the ball detent 73 is released from behind the neck 70 of the can C and the plunger 66 is withdrawn from the neck of the can so that the plunger 66 is fully withdrawn from the can C. This occurs when the cam follower 77 is in that portion of the cam track 78 identified in FIGURE 3 as the "Release" portion of the cam track.

It is to be noted that after the can has been released from the transfer element 64, the transfer element 64 remains in its projected position. However, the cam follower 88, in cooperation with the cam track 85, results in the swinging of the transfer element 64 back into alignment with the path of movement of the mandrels 28 whereby when the transfer element 64 reaches the bottom of the transfer assembly 24, it will be aligned with a new can carried by another mandrel and ready to receive the new can.

At this time it is pointed out that although separate conduits 98 extend to the holders 93, if desired, a manifold could extend around between the holders 93 at the inner surfaces thereof and a single conduit could supply air to the manifold. Such a manifold is illustrated in FIGURE 13 and is referred to by the numeral 109.

It is to be noted that in FIGURES 13 and 14 there is illustrated a modified form of transfer element which is generally referred to by the numeral 110. The transfer element 110 relies upon suction to retain a man C' in place during the transfer thereof from the conveyor 21 to the conveyor 23.

It is to be noted that the transfer element 110 is supported from its respective shaft 56 by means of an arm 63 in the same manner as is the transfer element 64. The transfer element 110 includes a block 111 which is suitably connected to the arm 63. The block 111 is provided at one end thereof with a recess 112 in which there is positioned a fitting 113. The fitting 113 also serves to clamp in place at the end of the block 111 a projecting seat forming conical ring 114. At the base of the recess 112 there is an annular passage 115 and the fitting 113 has a plurality of bores 116 defining passages which open into the passage 115. The fitting 113 is held in place by a centrally located fastener 117.

The block 111 has a passage 118 formed therethrough to which there is connected by means of a fitting 119 a conduit 120. The conduit 120 is, in turn, secured to the main shaft 33 at one end of a passage 121 formed therein. The other end of the passage 121 opens into the rotary valve assembly 104 in a manner to be described in detail hereinafter.

It is to be noted that the can C' is of the type having a sealed end. When the can C' is transferred from the associate mandrel 28 to the transfer element 110, a vacuum is drawn through the fitting 113 and as the end of the can C' engages the seat forming conical ring 114, a seal is formed and the vacuum drawn against the end of the can C' is sufficient to hold the can C' in place. After the can C' is placed on a support of the conveyor 23, the vacuum may be removed by venting, and the can C' released.

Particular attention is directed at this time to FIGURE 14 wherein there is illustrated a modified form of can holder which is generally referred to by the numeral 122. The can holder 122 includes a rod 123 which projects outwardly from the chain 31 of the conveyor 23. An elongated strip of sheet metal 124, which is preferably resilient, is bent to the shape shown in FIGURE 4 and anchored at the central portion in the ends thereon on the rod 123. It is to be noted that the rod 123 has a reduced end portion 125 which restricts movement of the shaped strip 124 thereon, and which has positioned thereon a retaining cap 126. The strip 124 is sufficiently resilient to have a resilient outwardly clamping engagement with the internal surface of the can member C'.

Reference is now made to FIGURES 15 and 16 wherein there are illustrated in detail the features of the bearing 47 and the rotary valve assembly 104. The end of the shaft 33 receiving the bearing and the valve assembly is of a stepped construction and includes stepped portions 127, 128 and 129 with the stepped portion 128 being externally threaded. The bearing 47 includes an inner race 130 which is positioned on the stepped portion 127 by means of a pair of spacers 131 and 132. A locking ring 133, which is threaded on the stepped portion 128, secures the spacers and the inner race in place.

The bearing 47 also includes an outer race 134 which opposes the inner race 130 and has rollers 135 separating the same. The outer race 134 is carried by a support 136 which is suitably seated in the side plate 45. A plate 137 is suitably secured against the right face of the support 136 and carries a seal 138. A second plate 139 is secured to the left face of the support 136 by a plurality of circumferentially spaced fasteners 140 and carries a seal 141.

The plate 139 may be considered a part of the valve 104. The plate 139 has secured thereto for limited axial movement a plate 142 which may be considered a valve plate and the details of which will be described hereinafter. The plate 142 is secured in place by means of a plurality of circumferentially spaced fasteners 143 and is resiliently urged to the left by circumferentially spaced springs 144 which are partially seated in the plate 139 and partially within the plate 142.

The rotary valve assembly 104 also includes an outer plate 145. The plate 145 is telescoped over the reduced portion 129 of the shaft 33 and is secured to the shaft 33 by means of fasteners 146. The plate 145 has formed therein a plurality of passages 147 which are aligned with the passages 121 and form continuations thereof. Each of the passages 147 opens into a radially extending passage 148 which has the outer end thereof closed by means of a plug 149. A port 150, which extends axially and opens to the inner face of the plate 145 is in communication with each of the passages 148.

The valve plate 142 has formed in the outer surface thereof a passage 151 which is aligned with the path of movement of the ports 150 and with which the ports 150 are in communication during a predetermined portion of their travel. The passage 151 has connected thereto a radial passage 152 to which there is connected a vacuum line 153. It is to be understood that the extent of the passage 151 is such so as to assure the production of a suction by the transfer element 110 at the proper time.

The outer face of the valve plate 142 also has formed therein a relatively short passage 154. The passage 154 is also in alignment with the path of movement of the ports 150. The passage 154 has connected thereto a radially extending passage 155 to which there is connected a vent line 156. After a suction has been produced at each of the transfer elements 110 in timed relation, and at such time as it is desired to release a can C' carried thereby, the space between the end of the can and the transfer element is vented to the atmosphere by the alignment of the respective port 150 with the passage 154.

It is to be understood that the springs 144 serve to tightly clamp together the faces of the plates 142 and 145 so as to maintain an effective seal therebetween even though the plate 145 is rotating and the valve plate 142 is stationary. In order to facilitate this relative rotation and the maintaining of a seal, means are provided for lubricating these opposed faces as they rotate. These means include a plurality of diagonal grooves 157 formed in the face of the valve plate 142. The grooves 157 are connected together by a lubricant passage 158 which, in turn, extends to a suitable fitting 159 through which lubricant may be delivered into the valve plate 142.

It is to be understood that the transfer elements 110 function in the same manner as the transfer elements 64 except for the manner in which cans are momentarily supported thereby. Accordingly, further description of the operation of the transfer elements 110 is believed to be unnecessary.

Although only several preferred embodiments of the invention have been specifically illustrated and described herein, it is to be understood that minor variations may be made within the disclosed invention without departing from the spirit and scope of the invention as specifically recited in the claims.

I claim:

1. A transfer mechanism comprising a fixed axis, a first conveyor mounted for movement about said axis along a first predetermined path, a second conveyor mounted for movement about said axis along a second predetermined path, and a transfer unit having transfer elements swingable between alignment with said first conveyor and said second conveyor in timed relation to the movement of said conveyors about said axis.

2. The transfer mechanism of claim 1 wherein said transfer unit is also movable about said axis.

3. The transfer mechanism of claim 1 wherein said transfer unit is also movable about said axis, and a single drive for effecting the movement of said conveyors and said transfer unit in unison.

4. The transfer mechanism of claim 1 wherein said transfer unit is also movable about said axis, and a single drive for effecting the movement of said conveyors and said transfer unit in unison, said drive including a common shaft extending along said axis.

5. The transfer mechanism of claim 1 wherein said transfer unit is also movable about said axis, and a single drive for effecting the movement of said conveyors and said transfer unit in unison, said drive being through one of said conveyors.

6. The transfer mechanism of claim 1 wherein said transfer unit is also movable about said axis and shiftable longitudinally of said axis.

7. The transfer mechanism of claim 1 wherein said conveyors carry holders facing in a first axial direction and said transfer elements face in the opposite axial direction.

8. The transfer mechanism of claim 1 wherein said conveyors carry holders facing in a first axial direction and said transfer elements face in the opposite axial direction, said holders lie generally in a common plane, and said transfer elements are axially shiftable towards and away from said plane.

9. The transfer mechanism of claim 1 wherein the paths of said conveyors are circular and of different radii, said transfer unit is mounted for rotation along a circular path having a radius intermediate said radii, and said transfer elements are carried by oscillating arms.

10. The transfer mechanism of claim 9 wherein said conveyors carry holders facing in a first axial direction and said transfer elements face in the opposite axial direction.

11. The transfer mechanism of claim 9 wherein said conveyors carry holders facing in a first axial direction and said transfer elements face in the opposite axial direction, said holders lie generally in a common plane, and said transfer elements are axially shiftable towards and away from said plane.

12. The transfer mechanism of claim 1 wherein the paths of said conveyors are circular and of different radii, said transfer unit is mounted for rotation along a circular path having a radius intermediate said radii, and said transfer elements are carried by arms, each extending generally radial from a support shaft, each support shaft having mounting means mounting said support shaft for both axial reciprocatory movement and oscillatory movement.

13. The transfer mechanism of claim 1 wherein one of said conveyors has means for discharging articles carried thereby onto said transfer elements, and said transfer elements have means for discharging articles onto the other of said conveyors.

14. The transfer mechanism of claim 13 wherein said one conveyor has supports primarily adapted for carrying tubular members having one open end and one generally closed end, and said one conveyor article discharging means including means for discharging a fluid under pressure into articles carried thereby through said one conveyor supports.

15. The transfer mechanism of claim 14 wherein said one conveyor supports are axially fixed and have a fluid passage, a fluid nozzle mounted in axial alignment with each one conveyor support, and means for axially reciprocating said fluid nozzles and bringing each fluid nozzle into operative position relative to its respective one conveyor support in timed relation to the movement of the respective one conveyor support about said axis.

16. The transfer mechanism of claim 13 wherein transfer elements are particularly adapted for receiving articles having tubular end portions, and each transfer element includes a nose portion for insertion within a tubular end portion.

17. The transfer mechanism of claim 16 wherein transfer elements discharge means include the mounting of each nose portion for retraction within a support, and means for effecting the timed retraction of said nose portions.

18. The transfer mechanism of claim 13 wherein said transfer elements are particularly for receiving articles having sealed end walls and each transfer element includes a seat for receiving an end wall of an article in sealed engagement, and mean for selectively drawing a vacuum within a space defined generally by said seat.

19. The transfer mechanism of claim 18 wherein said transfer elements discharge means includes means for effecting the timed pressurizing of said space defined generally by said seat.

20. The transfer mechanism of claim 1 wherein said transfer unit includes a shaft supporting each transfer element and means supporting each shaft parallel to said axis for axial reciprocatory movement and for oscillatory movement, and means connected to each shaft for effecting the timed reciprocation and oscillation thereof.

21. The transfer mechanism of claim 20 wherein said transfer unit is mounted for rotation about said axis, and said means for effecting the timed reciprocation of said shafts includes a fixed cam and a cam follower on each shaft engaged with said cam.

22. The transfer mechanism of claim 20 wherein said means for effecting the oscillation of said shafts include a rack and pinion assembly cooperatively associated with each shaft.

23. The transfer mechanism of claim 20 wherein said transfer unit is mounted for rotation about said axis, and said means for effecting the oscillation of said shafts include a rack and pinion assembly cooperatively associated with each shaft, a fixed cam, and a cam follower carried by each rack engaged with said cam to effect the automatic timed reciprocation of each rack.

References Cited

UNITED STATES PATENTS

| | | | |
|---|---|---|---|
| 2,965,214 | 12/1960 | Schlumpf | 198—20 |
| 3,330,400 | 7/1967 | Alexander | 198—22 |
| 3,300,019 | 1/1967 | Brigham. | |
| 3,339,698 | 9/1967 | Hartmeister | 198—25 |

RICHARD E. AEGERTER, Primary Examiner